United States Patent [19]

Kumagai et al.

[11] Patent Number: 5,701,976
[45] Date of Patent: Dec. 30, 1997

[54] HYDRAULIC BRAKE FOR TRANSMISSION

[75] Inventors: Yorinori Kumagai; Yoshihiro Kodama; Yoichi Kojima; Kiminobu Terao, all of Saitama, Japan

[73] Assignee: Honda Giken Kogyo Kabushiki Kaisha, Tokyo, Japan

[21] Appl. No.: 493,481

[22] Filed: Jun. 22, 1995

[30] Foreign Application Priority Data

| Jun. 22, 1994 | [JP] | Japan | 6-140583 |
| Feb. 13, 1995 | [JP] | Japan | 7-023970 |

[51] Int. Cl.$^6$ ............................................. F16D 25/0638
[52] U.S. Cl. ................ 188/71.5; 188/72.4; 192/85 AA; 92/151
[58] Field of Search ................ 188/71.5, 71.6, 188/72.3, 72.4, 106 F, 170, 347, 368–369; 192/4 A, 85 AA, 85 CA, 85 R, 70.28, 3.52; 475/317, 318; 92/157

[56] References Cited

U.S. PATENT DOCUMENTS

| 2,901,888 | 9/1959 | Swift | 92/151 |
| 3,480,115 | 11/1969 | Lallemant | 188/71.5 |
| 3,547,233 | 12/1970 | Girvan | 188/72.3 |
| 3,599,512 | 8/1971 | Wayman | 188/72.4 |
| 3,650,364 | 3/1972 | Laing | 192/85 AA |
| 4,560,034 | 12/1985 | Windish et al. | 188/72.3 |
| 4,753,136 | 6/1988 | Hayakawa et al. | 92/151 |
| 5,511,644 | 4/1996 | Murata | 192/85 AA |

FOREIGN PATENT DOCUMENTS

| 543908 | 2/1993 | Japan . |

*Primary Examiner*—Robert Oberleitner
*Assistant Examiner*—Chris Schwartz
*Attorney, Agent, or Firm*—Lyon & Lyon LLP

[57] ABSTRACT

In a hydraulic brake for a transmission, an assist piston, a reaction piston and a main piston are accommodated on a cylinder. The assist piston has a first acting portion in abutment against the main piston, and the main piston has a second acting portion facing one end of stacked frictional engaging elements. The assist piston and the main piston are moved rightwardly by a hydraulic pressure supplied to a first oil chamber and a second oil chamber to bring the frictional engaging elements into engagement with one another. The first and second acting portions are superposed as viewed axially, thereby preventing a jarring of the assist piston and the main piston. In one embodiment, each of the pistons is formed from a pressed article, whereby the machining cost can be reduced and, moreover, oil passages connecting the first and second oil chambers can be provided in a simple manner.

10 Claims, 6 Drawing Sheets

HYDRAULIC BRAKE FOR TRANSMISSION

BACKGROUND OF THE INVENTION

1. Field of the Invention

The present invention relates to a hydraulic brake for a transmission, including an assist piston, a reaction piston and a main piston which are disposed on a cylinder, so that the hydraulic pressure is boosted by these pistons, and a plurality of frictional engaging elements are brought into pressing contact with one another by such hydraulic pressure to couple a rotatable member to a stationary member.

2. Description of the Prior Art

Such a hydraulic brake for a transmission is known from Japanese Patent Publication No. 43908/93.

In the hydraulic brake for the transmission described in the above patent publication, a first acting portion of the assist piston for urging the main piston and a second acting portion of the main piston for urging the frictional engaging elements are substantially offset radially. Therefore, there is a problem in the known hydraulic brake that a jarring occurs in the sliding movement of the assist piston and the main piston, and as a result, the urging forces of the pistons are not smoothly transmitted to the frictional engaging elements.

SUMMARY OF THE INVENTION

Accordingly, it is an object of the present invention to provide a hydraulic brake, wherein the jarring of each piston in the hydraulic brake is prevented to ensure that the urging force of the piston is smoothly transmitted to the frictional engaging elements.

To achieve the above object, according to the present invention, there is provided a hydraulic brake for a transmission, comprising, an assist piston, a reaction piston and a main piston which are axially disposed on a cylinder sequentially in the named order, such that a first frictional engaging element supported on a rotatable member and a second frictional engaging element supported on a stationary member are brought into pressing contact with each other to couple said rotatable member to said stationary member, said assist piston defining a first oil chamber between a rear end of the assist piston and said cylinder, and having a first acting portion at a front portion of the assist piston for engaging and urging a rear portion of said main piston, said reaction piston being substantially fixed relative to said cylinder, said assist piston and said main piston being axially slidable relative to said reaction piston, said main piston defining a second oil chamber between a rear portion of the main piston and said reaction piston to communicate with said first oil chamber, and having a second acting portion at a front portion of the main piston for bringing said first and second frictional engaging elements into pressing contact with each other, said first and second acting portions being superposed on each other as viewed axially.

With the above arrangement, the line of action of an urging force of the first acting portion and the line of action of an urging force of the second acting portion can be aligned with each other. Thus, each of the pistons can be smoothly slid axially while preventing the generation of a jarring, thereby reliably bringing the first and second frictional engaging elements into pressing contact with each other.

The hydraulic brake may further include a frictional engaging element holder which is provided with a cylinder supporting portion for supporting the cylinder, and with a guide arm for guiding said second frictional engaging element, and said guide arm may be provided at a tip end thereof with a locking portion for preventing the disassembly of said first and second frictional engaging elements. Thus, it is possible to improve the assembling workability of the hydraulic brake in the form of an assembly.

An oil passageway for connecting the first and second oil chambers to each other may be comprised of a first oil passage defined between the cylinder and the assist piston, and a second oil passage defined between the assist piston and the main piston. Thus, it is not necessary to define such an oil passageway in the casing, leading to a reduction in machining cost.

The above and other objects, features and advantages of the invention will become apparent from preferred embodiments taken in conjunction with the accompanying drawings.

DESCRIPTION OF THE PREFERRED EMBODIMENTS

The present invention will now be described by way of preferred embodiments with reference to the accompanying drawings.

Figure 1:
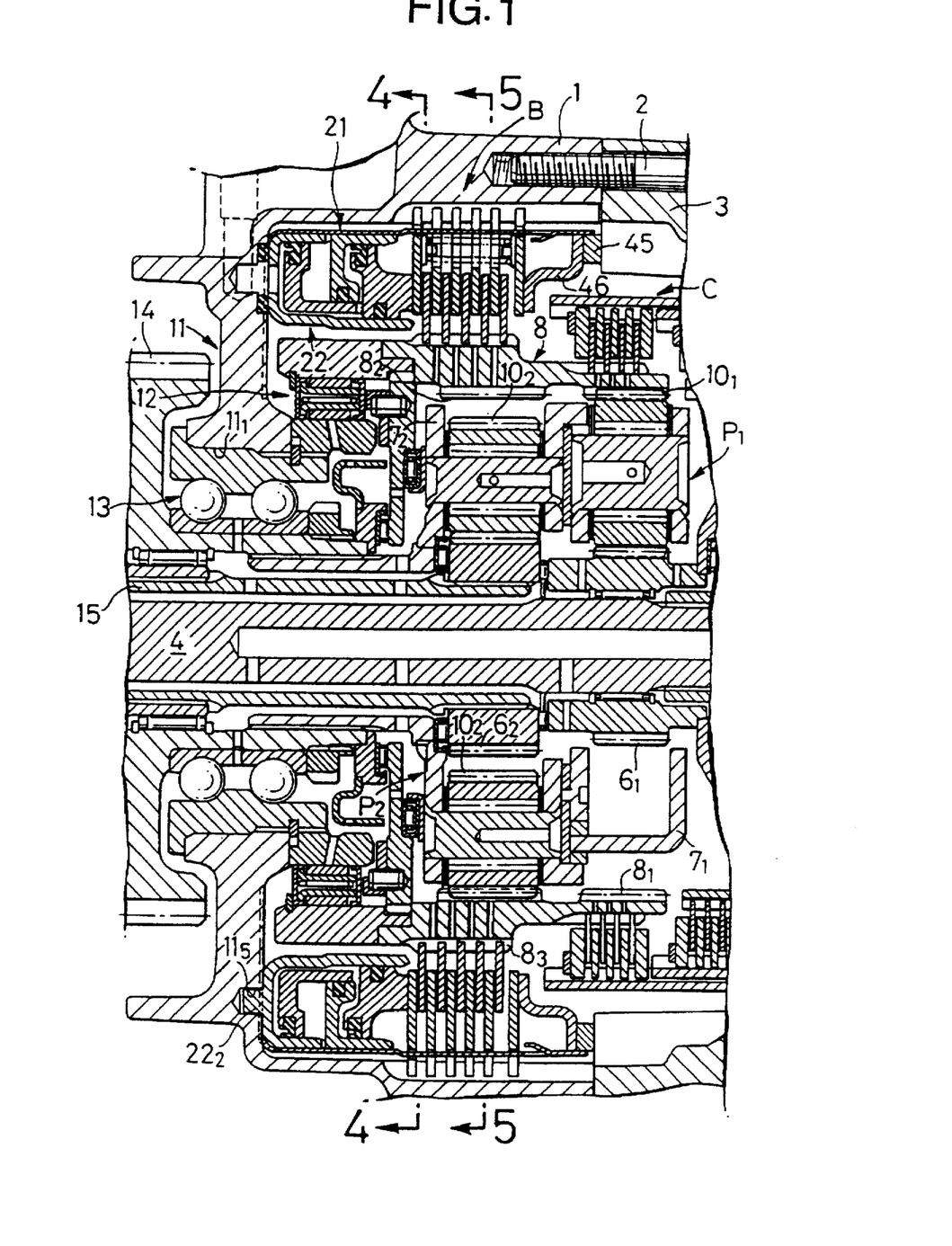
FIG. 1 is a partial sectional view of a transmission for a motor vehicle, to which a first embodiment of the present invention is applied.

Referring to FIG. 1 illustrating a first embodiment, a main shaft 4 is disposed within a casing 1 and a cover 3 is coupled to the casing 1 by bolts 2. The main shaft 4 is connected to an engine through a torque converter (both not shown) and driven for rotation. A first planetary gear mechanism $P_1$ of a single planetary gear type and a second planetary gear mechanism $P_2$ of a double planetary gear type are axially juxtaposed around an outer periphery of the main shaft 4. The first planetary gear mechanism $P_1$ and the second planetary gear mechanism $P_2$ include sun gears $6_1$, $6_2$, planetary carriers $7_1$, $7_2$ and ring gears $8_1$ and $8_2$, respectively. The planetary carriers $7_1$, $7_2$ are integrally coupled to each other, and the ring gears $8_1$ and $8_2$ are integrally formed on an inner periphery of a ring gear carrying member 8. A plurality of planetary gears $10_1$ are carried on the planetary carrier $7_1$ and meshed simultaneously with the sun gear $6_1$ and the ring gear $8_1$. A plurality of inner planetary gears $10_2$ are carried on the planetary carrier $7_2$ and meshed with the sun gear $6_2$. A plurality of outer planetary gears $10_2$ are meshed with the ring gear $8_2$. The inner and outer planetary gears $10_2$ are meshed with each other (see FIG. 5).

The ring gear carrying member 8 is supported on a partition wall 11 of the casing 1 with a one-way clutch 12 interposed therebetween and is capable of being coupled to the casing 1 through a hydraulic brake B and to the main shaft 4 through a hydraulic clutch C (partially shown). A final drive gear 14 is carried on the partition wall 11 of the casing 1 with a ball bearing 13 interposed therebetween and is spline-coupled to the planetary carrier $7_2$ of the second planetary gear mechanism $P_2$. The sun gear $6_2$ of the second planetary gear mechanism $P_2$ is spline-coupled to a sleeve 15 which is disposed between the outer periphery of the main shaft 4 and an inner periphery of the final drive gear 14.

The structure of the hydraulic brake B will be described in detail with reference to FIGS. 2 to 5 along with FIG. 1.

Figure 2:
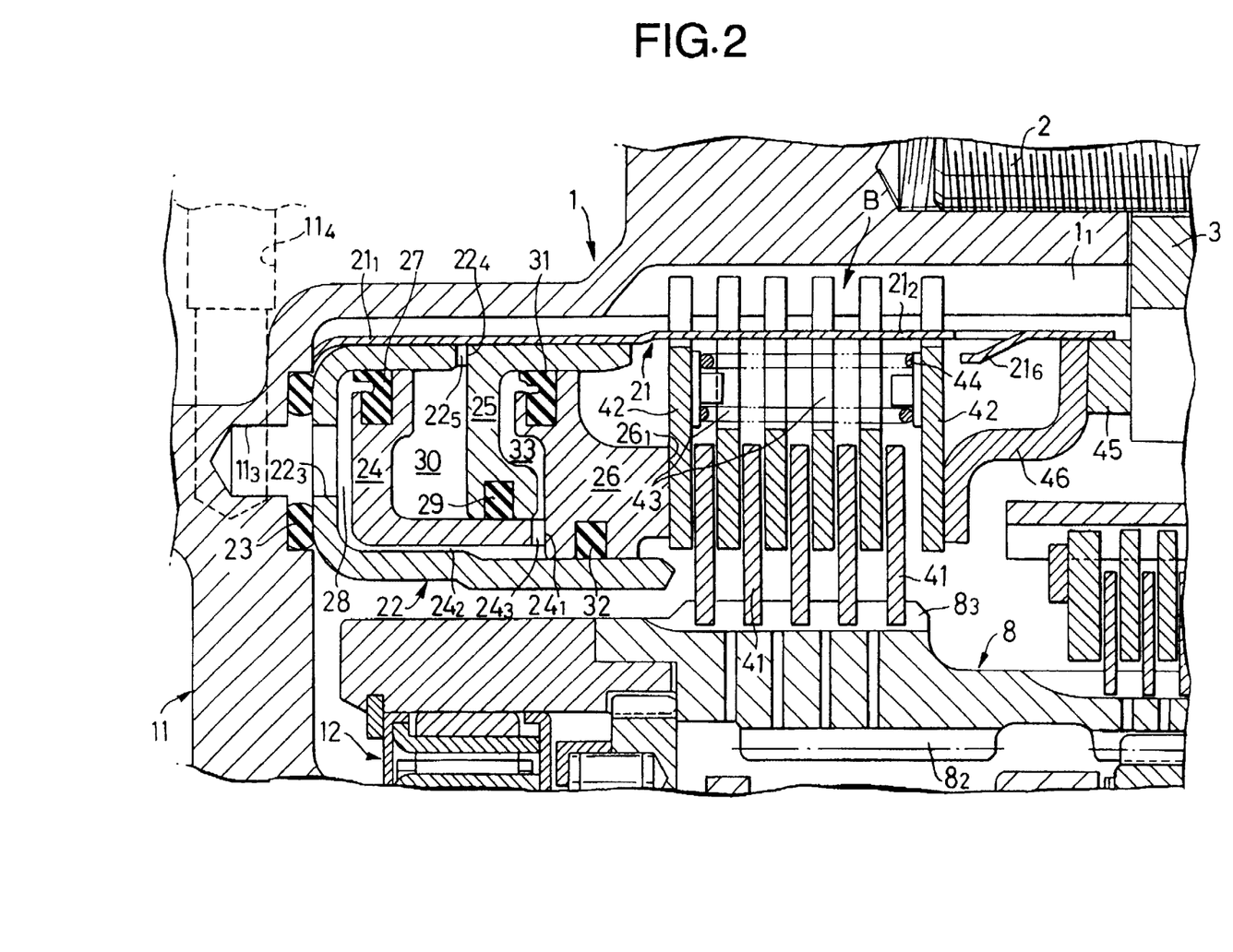
FIG. 2 is an enlarged view of an essential portion shown in FIG. 1.
Figure 3:
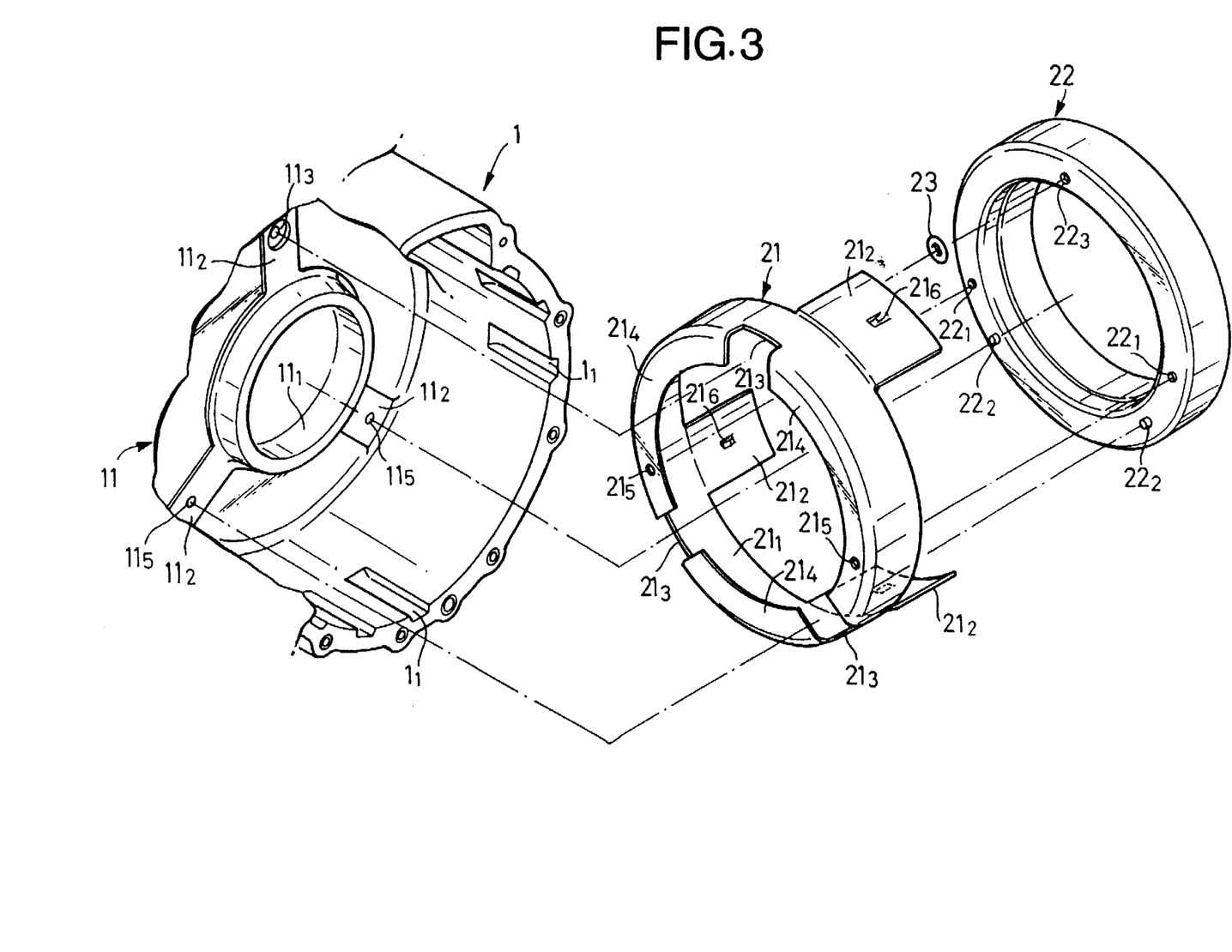
FIG. 3 is an exploded perspective view of a portion of the essential portion illustrated in FIG. 2.

As shown in FIGS. 2 and 3, the hydraulic brake B includes a frictional engaging element holder 21 and a cylinder 22 which are retained on a right side surface of the partition wall 11 of the casing 1 coaxial with the main shaft 4. The frictional engaging element holder 21 includes a cylinder supporting portion $21_1$ formed into an annular shape, three guide arms $21_2$ extending axially rightwardly from the cylinder supporting portion $21_1$ at circumferential spacing angles of 120° with respect to one another, and three notches $21_3$ and three flanges $21_4$ integrally formed on a left end of the cylinder supporting portion $21_4$. The cylinder 22 is an annular member having a J-shaped section. The cylinder 22 is provided at a left end face thereof with a pair of first positioning projections $22_1$, $22_1$, a pair of second positioning projections $22_2$, $22_2$ and an oil hole $22_3$. Provided at a right side surface of the partition wall 11 of the casing 1 are: a ball bearing supporting hole $11_1$ for supporting the ball bearing 13; three projections $11_2$ circumferentially spaced by angles of 120° with respect to one another and extending radially from an outer periphery of the ball bearing supporting hole $11_1$; an oil hole $11_3$ defined in one of the projections $11_1$; and an oil passage $11_4$ connected to the oil hole $11_3$.

When the cylinder 22 and the frictional engaging element holder 21 are fitted to and retained on the right side of the partition wall 11 of the casing 1, the pair of first positioning projections $22_1$, $22_1$ of the cylinder 22 are fitted into a pair of positioning holes $21_5$, $21_5$ defined in two of the flanges $21_4$, $21_4$ of the frictional engaging element holder 21, and the pair of second positioning projections $22_2$, $22_2$ of the cylinder 22 are fitted through two of the notches $21_3$, $21_3$ of the frictional engaging element holder 21 into a pair of positioning holes $11_5$, $11_5$ defined in two of the projections $11_2$, $11_2$. The three notches $21_3$ of the frictional engaging element holder 21 are fitted to the three projections $11_2$, respectively, whereby the frictional engaging element holder 21 and the cylinder 22 are retained on the partition wall 11. In this assembled condition, the oil hole $11_3$ defined in the partition wall 11 is in communication with the oil hole $22_3$ defined in the cylinder 22 and is sealed by a sealing member 23.

An assist piston 24, a reaction piston 25 and a main piston 26 are inserted onto the disposed on the cylinder 22 so as to be arranged axially in the named order from a left side to a right side thereof.

The assist piston 24 is an annular member having a substantially L-shaped section, with its outer periphery being in sliding contact with an inner wall surface of the cylinder 22 through a sealing member 27 (a lip seal). A first oil chamber 28 is defined between a left end face of the assist piston 24 and a bottom wall of the cylinder 22, and the oil hole $22_3$ opens into the first oil chamber 28.

The reaction piston 25 is an annular member having a substantially L-shaped section. An outer periphery of the reaction piston 25 is guided on inner surfaces of the guide arms $21_2$ of the frictional engaging element holder 21, and an inner periphery of the reaction piston 25 is in sliding contact with the assist piston 24 with a sealing member 29 interposed therebetween. A left end face of the reaction piston 25 is abutted against a pressure receiving portion $22_4$ formed on a right end face of the outer periphery of the cylinder 22, and a space 30 is defined between the assist piston 24 and the reaction piston 25. The space 30 is in communication with an internal space within the transmission through a plurality of notches $22_5$ provided in the pressure receiving portion $22_4$ of the cylinder 22. The reaction piston 25 is limited in leftward movement by the abutment against the cylinder and is permitted to be only moved rightwardly. However, the reaction piston 25 is biased leftwardly by a return spring (which will be described hereinafter) and by hydraulic pressure during actuation of the brake and hence, cannot be moved rightwardly when reaction piston 25 is substantially fixed to the cylinder 22.

An outer periphery of the annular main piston 26 is in sliding contact with the reaction piston 25 through a sealing member 31 (a lip seal), and an inner periphery of the annular main piston 26 is in sliding contact with an inner wall surface of the cylinder 22 through a sealing member 32. A left end face of the main piston 26 is abutted against a first acting portion $24_1$ formed on a right end face of the inner periphery of the assist piston 24, and a second oil chamber 33 is defined between the main piston 26 and the reaction piston 25. A second acting portion $26_1$ is formed on a right end face of the main piston 26 which abuts against an end plate which will be described hereinafter.

A first axially extending oil passage $24_2$ is defined between the cylinder 22 and the assist piston 24, and second oil passages $24_3$ comprising eight notches are formed in the first acting portion $24_1$ of the assist piston 24 which abuts against the main piston 26. The first oil chamber 28 is in communication with the second oil chamber 33 through the first oil passage $24_2$ and the second oil passage $24_3$. In this way, the oil passages (i.e., the first oil passage $24_2$ and the second oil passages $24_3$) permitting the communication between the first and second oil chambers 28 and 33 are provided between assist piston 24 and the main piston 26 and therefore, the need for providing an oil passageway in the casing by machining is eliminated, leading to a reduced machining cost.

In the first embodiment, the cylinder 22 is a pressed article made of an iron-based material, and each of the assist piston 24, the reaction piston 25 and the main piston 26 is a die-cast article made of an aluminum-based material.

Figure 4:
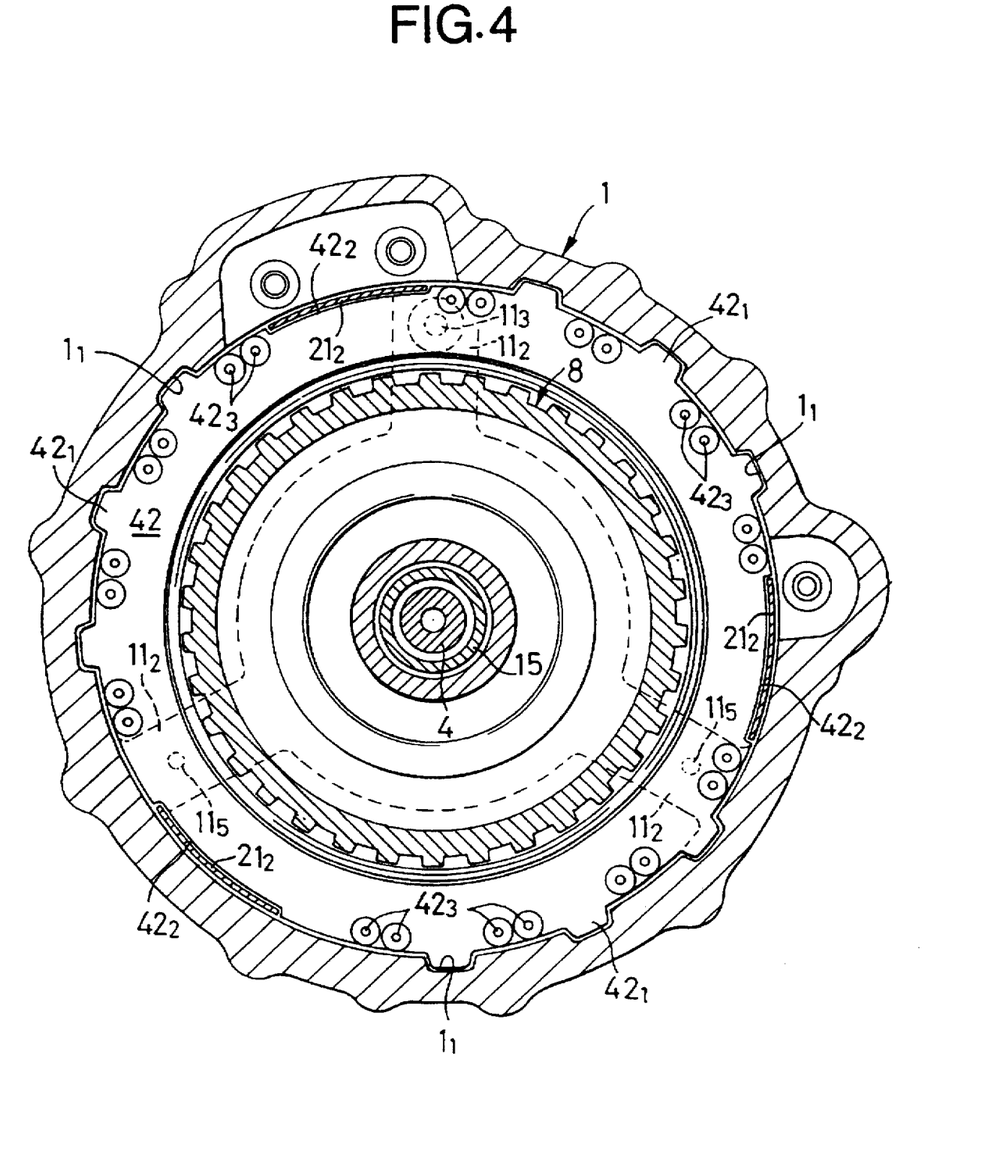
FIG. 4 is a sectional view taken along a line 4—4 in FIG. 1.
Figure 5:
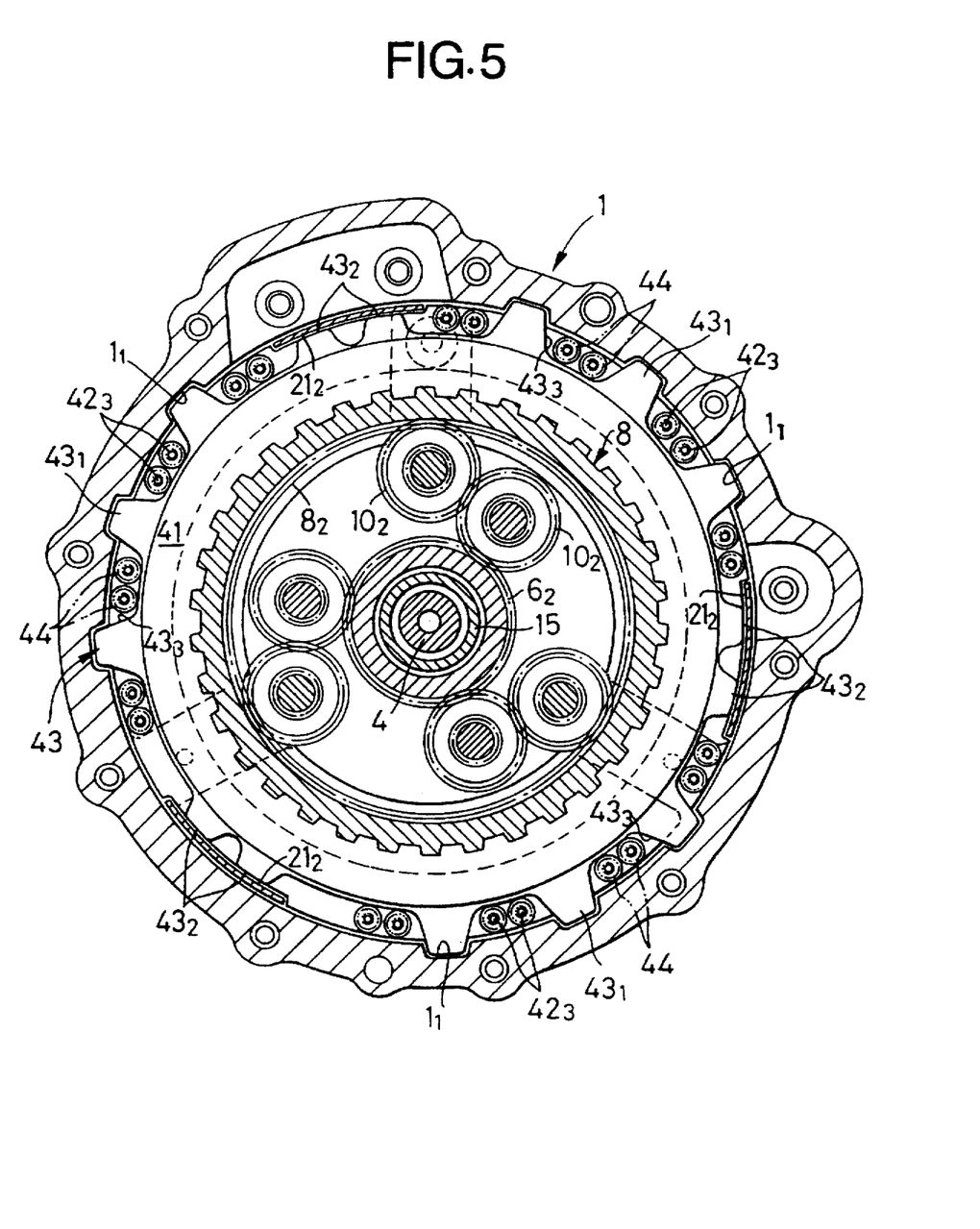
FIG. 5 is a sectional view taken along a line 5—5 in FIG. 1.

As also can be seen from FIGS. 4 and 5, five brake disks 41 as first frictional engaging elements are relatively non-rotatably and axially slidably supported in splines $8_3$ formed in an outer periphery of the ring gear carrying member 8. Two brake end plates 42, 42 and four brake plates 43 as second frictional engaging elements are alternately superposed on the five brake disks 41. A plurality of projections $42_1$ and a plurality of projections $43_1$ are provided on an outer periphery of each of the brake end plates 42 and each of the brake plates 43, respectively, so that the brake end plates 42 and the brake plates 43 are relatively non-rotatably and axially slidably supported in the casing 1 by engagement of these projections $42_1$ and $43_1$ in splines $1_1$ formed in an inner periphery of the casing 1.

Three guide portions $42_2$ are formed on the outer periphery of each of the brake end plates 42 to come into sliding contact with the three guide arms $21_2$ of the frictional engaging element holder 21, and three pairs of guide portions (six in total) $43_2$ are formed on the outer periphery of each of the brake plates 43 to come into sliding contact with the inner peripheries of the three guide arms $21_2$, respectively.

The brake end plates 42, 42 and the brake plates 43 mainly receive a torque in a rotating direction by engagement of their projections $42_1$ and $43_1$ in the splines $1_1$ in the casing 1, and are positioned radially by sliding contact of their guide portions $42_2$ and $43_2$ with the inner surfaces of the guide arms $21_2$ of the frictional engaging element holder 21.

Twelve spring seats $42_3$ are mounted to the outer peripheries of each of the brake end plates 42, and the ends of a pair of return springs 44, 44 that extend between the end plates 42 abut against each of the spring seats $42_3$. On the other hand, twelve notches $43_3$ are defined in the outer peripheries of the brake plates 43, and each pair of return springs 44 loosely fit in each of the notches $43_3$.

Each of the three guide arms $21_2$ of the frictional engaging element holder 21 is provided at its tip end with a radially protruding locking portion $21_6$ formed by cutting and punching the metal. These locking portions $21_6$ are engageable with the right side of the right brake end plate 42 during assembly, as described below. A back-up plate 46 is mounted between a left side surface of the cover 3 and the right side surface of the right brake end plate 42 with a shim 45 interposed between the back-up plate 46 itself and the corner 3.

The operation of the embodiment of the present invention having the above-described construction will be described below.

If a working oil is supplied to the first oil chamber 28 in the cylinder 22 through the oil passage $11_4$ and the oil hole $11_3$ provided in the partition wall 11 of the casing 1 in order to bring the hydraulic brake B into an engaged state to frictionally lock the ring gear carrying member 8 to the casing 1, the assist piston 24 is moved rightwardly, so that the first acting portion $24_1$ thereof urges the main piston 26 rightwardly. The working oil in the first oil chamber 28 is also applied to the second oil chamber 33 through the first oil passage $24_2$ and the second oil passages $24_3$. The reaction piston 25 defining the second oil chamber 33 by cooperation with the main piston 26 is in abutment against the pressure receiving portion $22_4$ of the cylinder 22, whereby the leftward movement of the reaction piston 25 is limited. Therefore, the hydraulic pressure in the second oil chamber 33 urges the main piston 26 rightwardly.

A resultant force from (1) an urging force of the assist piston 24 moved rightwardly by the hydraulic pressure in the first oil chamber 28 and (2) an urging force of the main piston 26 moved rightwardly by the hydraulic pressure in the second oil chamber 33, is transmitted through the second acting portion $26_1$ of the main piston 26 to the left brake end plate 42. As a result, the brake disks 41 and the brake plates 43 are clamped between the left brake end plate 42 and the right brake end plate 42 whose movement is limited by the back-up plate 46, whereby the ring gear carrying member 8 is frictionally locked to the casing 1.

At that time, as can be seen from FIG. 2, the first acting portion $24_1$ of the assist piston 24 and the second acting portion $26_1$ of the main piston 26 are superposed on each other as viewed axially, and therefore, the line of action of the urging force of the first acting portion $24_4$ and a line of action of the urging force of the second acting portion $26_1$ can be substantially aligned with each other to prevent a jarring of the assist piston 24 and the main piston 26. Thus, the assist piston 24 and the main piston 26 can axially and smoothly slide, thereby reliably bringing the brake disks 41, the brake end plates 42, 42 and the brake plates 43 into pressing contact with one another.

Moreover, the abutment portions of the back-up plate 46 and the right brake end plate 42 are located on an extension of the action line of the urging force of the second acting portion $26_1$ for urging the left brake end plate 42 and therefore, the abutments between the brake disks 41, the brake end plate 42, 42 and the brake plates 43 are uniform and aligned to provide an improved durability.

The hydraulic brake B is subassembled in the following manner into an assembly and then collectively assembled within the casing 1. Namely, the cylinder 22 having assist piston 24, the reaction piston 25 and the main piston 26 incorporated therein is fitted into the cylinder supporting portion $21_1$ of the frictional engaging element holder 1, and then, the left brake end plate 42 is fitted to the guide arms $21_2$ of the frictional engaging element holder 21. Subsequently, the five brake disks 41 and the four brake plates 43 are alternately superposed on one another, and the twenty-four return springs 44 are mounted on the outer periphery of these superposed members. Thereafter, the right brake end plate 42 is fitted to the guide arms $21_2$. Finally, the locking portions $21_6$ of the guide arms $21_2$ are punched radially inwardly to engage the right side of the right brake end plate 42, thus preventing the disassembly of the aforementioned elements from the frictional engaging element holder 21. The locking portions may be precut and punched to allow the elements to be successively snapped into the frictional engaging element holder 21 during assembly.

When the hydraulic brake B has been subassembled in this manner, the left brake end plate 42 is brought into abutment against the second acting portion $26_1$ of the main piston 26 by preset loads of the return springs 44 and retained axially, and the right brake end plate 42 is brought into abutment against the locking portion $21_6$ of the guide arm $21_2$ and retained radially.

The four brake plates 43 and two brake end plates 42, 42 are retained radially with their guide portions $43_2$ and $42_2$, respectively, in abutment against the inner surfaces of the guide arms $21_2$. Further, the five brake disks 41 superposed alternately on the two brake end plates 42, 42 and the four brake plates 43 are retained radially with their outer peripheries restrained by the twenty-four return springs 44.

The hydraulic brake B, subassembled in the above-described manner, is inserted through the opening at the right end of the casing 1 into the leftward position. At that time, the inner peripheries of the brake disks 41 are fitted into the splines $8_3$ in the ring gear carrying member 8, and the outer peripheries of the brake end plates 42, 42 and the brake plates 43 are fitted into the spline $1_1$ in the casing 1. In addition, during this assembling the three notches $21_3$ in the frictional engaging element holder 21 are aligned with and fit over the three projections $11_2$ on the casing partition wall 11 with the projections $22_2$ fitted into the positioning holes $11_5$ and the sealing member 23 is installed.

Subsequently, the back-up plate 46 and the shim 45 are superposed on the right side of the right brake end plate 42, and the cover 3 is mounted to the opening at the right end of the casing 1 and fixed thereto by bolts 2. This causes the right brake end plate 42 to be urged leftwardly away from the locking portions $21_6$ of the guide arms $21_2$ by the back-up plate 46. At that time, the clearances between the brake disks 41, the brake end plates 42, 42 and the brake plates 43 can be adjusted by properly selecting the thickness of the shim 45.

Figure 6:
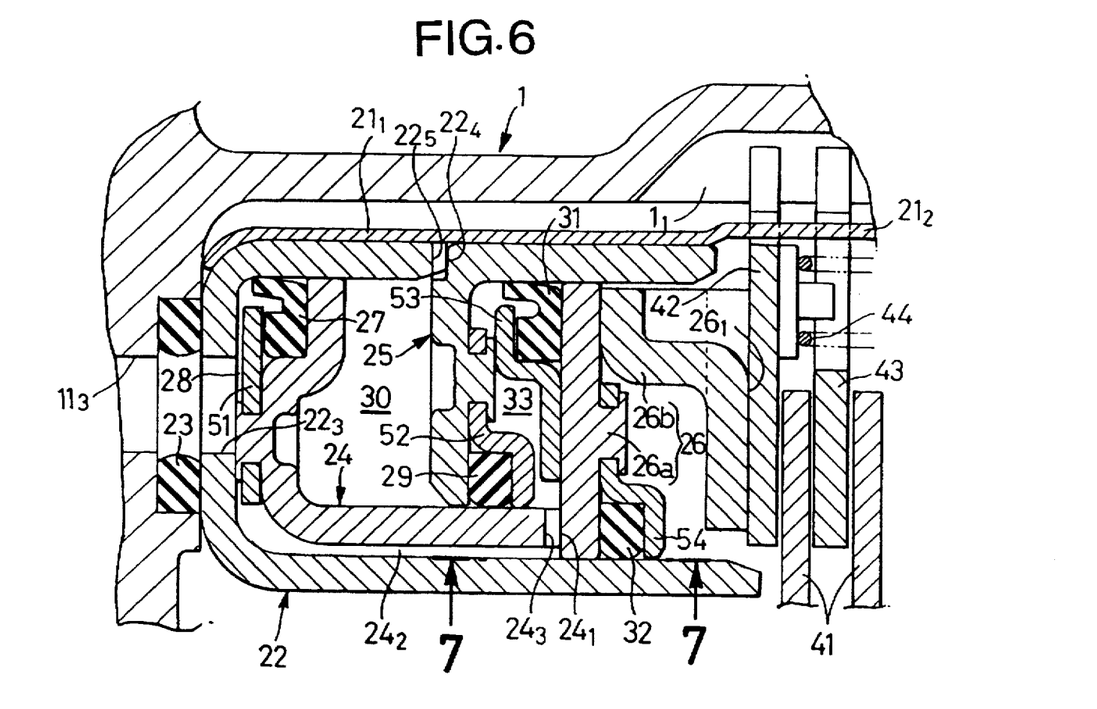
FIG. 6 is a view similar to FIG. 2, but illustrating a second embodiment.
Figure 7:
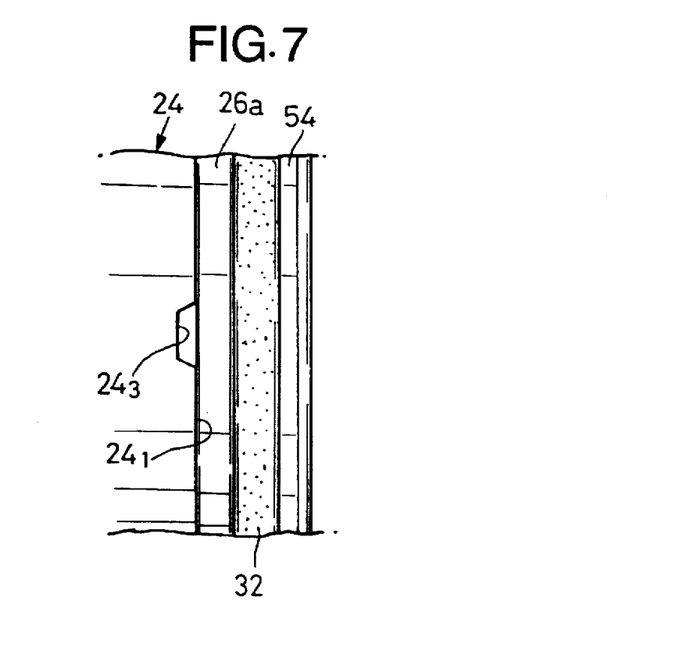
FIG. 7 is a fragmentary view taken in the direction of arrows 7 in FIG. 6.

A second embodiment of the present invention will now be described with reference to FIGS. 6 and 7.

In the second embodiment, each of an assist piston 24, a reaction piston 25 and a main piston 26 is formed from pressed articles, such as sheet metal pressed to the desired shape in a die. The main piston 26 is comprised of a first piston half 26a and a second piston half 26b, both of which are pressed articles. Projections are provided in an axially protruding fashion on a peripheral edge of the second piston half 26b at three points to abut against a side of the first piston half 26a. A sealing member 27 is provided on the assist piston 24 for sealing its surface which is in sliding contact with the cylinder 22. The sealing member 27 is retained by a sealing member holder 51 fixed to the assist piston 24 by crimping. Likewise, a sealing member 29 is retained on the reaction piston 25 by a sealing member holder 52 for sealing the inner surface of the reaction piston 25 which is in sliding contact with the assist piston 24, and two sealing members 31 and 32 are retained on the main piston 26 by sealing member holders 53 and 54 for sealing those surfaces of the main piston 26 which are in sliding contact with the reaction piston 25 and the cylinder 22, respectively.

The first oil chamber 28 and the second oil chamber 33 are in communication with each other through a first oil passage $24_2$ defined between the cylinder 22 and the assist piston 24 and second oil passage $24_3$ comprised of eight notches formed in the first acting portion $24_1$ of the assist piston 24. Since the assist piston 24 is formed from a pressed article, the first oil passage $24_2$ and the second oil passage $24_3$ can be made simultaneously in the assist piston 24 by a punch press machine, thereby further reducing the machining cost in cooperation with the elimination of the need for providing an oil passageway in the casing 1 by machining.

When the assist piston 24, the reaction piston 25 and the main piston 26 are formed in a die-casting process, it is necessary to precisely machine the left end face of the main piston 26 abutting against the first acting portion $24_1$ or the like. However, by forming the assist piston 24, the reaction piston 25 and the main piston 26 from pressed articles of a high dimensional accuracy as in the second embodiment, that machining is made unnecessary. This makes it possible not only to reduce the machining cost, but also to assure smooth movements of the pistons 24, 25 and 26.

Even in the second embodiment, the first acting portion $24_1$ of the assist piston 24 and the second acting portion $26_1$ of the main piston 26 are superposed to each other and therefore, the line of action of the urging force of the first acting portion $24_1$ and the line of action of the urging force of the second acting portion $26_1$ can be substantially aligned with each other to prevent the jarring of the assist piston 24 and the main piston 26, and to reliably bring the brake disks 41, the brake end plates 42, 42 and the brake plates 43 into pressing contact with one another.

Although the embodiments of the present invention have been described in detail, it will be understood that the present invention is not limited to the above-described embodiments, and various modifications in design may be made without departing from the spirit and scope of the invention defined in claims.

For example, in the embodiment, the area of the first acting portion $24_1$ of the assist piston 24 is smaller than that of the second acting portion $26_1$ of the main piston 26, and the first acting portion $24_1$ is provided so that it is superposed in the vicinity of the radially inner end of the second acting portion $26_1$, however, the relationships in area magnitude and position between the first and second acting portions $24_1$ and $26_1$ can be changed as desired. Namely, what is important is that the first and second acting portions $24_1$ and $26_1$ are superposed on each other at least partially as viewed axially, i.e. at least a portion of the first and second acting portions are at substantially the same radial distance from main shaft 4.

What is claimed is:

1. A hydraulic brake for a transmission, comprising,
    an assist piston, a reaction piston and a main piston disposed on a cylinder so as to be axially arranged sequentially in the named order, such that a first frictional engaging element supported on a rotatable member and a second frictional engaging element supported on a stationary member are brought into pressing contact with each other to couple said rotatable member to said stationary member, said assist piston defining a first oil chamber between a rear end of the assist piston and said cylinder, said assist piston having a first acting portion at a front portion of the assist piston for engaging and urging a rear portion of said main piston, said reaction piston being substantially fixed relative to said cylinder, said assist piston and said main piston being axially slidable relative to said reaction piston, said main piston defining a second oil chamber between a rear portion of the main piston and said reaction piston to communicate with said first oil chamber, said main piston having a second acting portion at a front portion of the main piston for bringing said first and second frictional engaging elements into pressing contact with each other, said first and second acting portions being superposed on each other as viewed axially.

2. A hydraulic brake for a transmission according to claim 1, further including a frictional engaging element holder which is provided with a cylinder supporting portion for supporting the cylinder and with a guide arm for guiding said second frictional engaging element, said guide arm being provided at a tip end thereof with a locking portion for preventing disassembly of said first and second frictional engaging elements from said frictional engaging element holder.

3. A hydraulic brake for a transmission according to claim 2, further including an oil passageway for connecting the first and second oil chambers to each other, said oil passageway being comprised of a first oil passage formed between said cylinder and said assist piston, and a second oil passage formed between said assist piston and said main piston.

4. A hydraulic brake for a transmission according to claim 3, wherein each of said assist piston, said reaction piston and said main piston is comprised of at least one pressed article.

5. A hydraulic brake for a transmission according to claim 1, wherein each of said assist piston, said reaction piston and said main piston is comprised of at least one pressed article.

6. A hydraulic brake for a transmission according to claim 1, further including an oil passageway for connecting the first and second oil chambers to each other, said oil passageway being comprised of a first oil passage formed between said cylinder and said assist piston, and a second oil passage formed between said assist piston and said main piston.

7. A hydraulic brake for a transmission of a vehicle, the hydraulic brake having
    an assist piston, a reaction piston and a main piston which are axially disposed and movable on a cylinder for imposing engaging forces on frictional engaging elements of the brake, the assist piston having a first acting portion at an axial front portion for engaging and urging an axial rear portion of the main piston, the main piston having a second acting portion at an axial front portion of the main piston for imposing engaging forces on said frictional engaging elements of the brake, an improvement comprising, said first and second acting portions being located at least partially at equal radial distances from an axis of the brake.

8. A hydraulic brake for a transmission according to claim 7, further including a frictional engaging element holder which is provided with a cylinder supporting portion for supporting the cylinder and with a guide arm for guiding the frictional engaging elements, said guide arm being provided at a tip end thereof with a locking portion for preventing disassembly of said frictional engaging elements from said frictional engaging element holder.

9. A hydraulic brake for a transmission according to claim 7, further including a first oil chamber between the cylinder and the assist piston, a second oil chamber between the reaction piston and the main piston, an oil passageway for connecting the first and second oil chambers to each other, said oil passageway being comprised of a first oil passage formed between said cylinder and said assist piston, and a second oil passage formed between said assist piston and said main piston.

10. A hydraulic brake for a transmission according to claim 7, wherein each of said assist piston, said reaction piston and said main piston is comprised of at least one pressed article.

* * * * *